(12) United States Patent
Pulleyn et al.

(10) Patent No.: US 9,021,079 B2
(45) Date of Patent: *Apr. 28, 2015

(54) DOMAIN NAME SERVICE SERVER

(75) Inventors: Ivan W. Pulleyn, Sunnyvale, CA (US); Stuart M. Bailey, San Jose, CA (US)

(73) Assignee: Infoblox Inc., Santa Clara, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/609,080

(22) Filed: Sep. 10, 2012

(65) Prior Publication Data

US 2013/0067054 A1   Mar. 14, 2013

Related U.S. Application Data

(63) Continuation of application No. 12/849,768, filed on Aug. 3, 2010, now Pat. No. 8,285,823, which is a continuation of application No. 10/799,033, filed on Mar. 12, 2004, now Pat. No. 7,814,180, which is a continuation of application No. 09/615,271, filed on Jul. 13, 2000, now abandoned.

(51) Int. Cl.
*G06F 15/177* (2006.01)
*H04L 29/12* (2006.01)

(52) U.S. Cl.
CPC .... *H04L 29/12066* (2013.01); *H04L 29/12132* (2013.01); *H04L 61/1511* (2013.01); *H04L 61/1552* (2013.01)

(58) Field of Classification Search
USPC .................................. 709/220, 221, 222, 245
See application file for complete search history.

(56) References Cited

U.S. PATENT DOCUMENTS

| | | | | |
|---|---|---|---|---|
| 6,131,095 A * | 10/2000 | Low et al. | ............................. | 1/1 |
| 6,519,589 B2 * | 2/2003 | Mann et al. | ............................. | 1/1 |
| 6,594,254 B1 * | 7/2003 | Kelly | ............................. | 370/352 |
| 7,127,471 B1 * | 10/2006 | Wilson | ........................ | 358/1.15 |

* cited by examiner

*Primary Examiner* — Kenny Lin
(74) *Attorney, Agent, or Firm* — Van Pelt, Yi & James LLP (57) ABSTRACT

A DNS server system provides IP addresses for a host in a computer network. Upon receiving a request from a client for an IP address associated with a domain name, the requested IP address is retrieved from an object oriented database and transmitted to the client. The DNS server system provides configuration access from a client in a computer network. Communicative coupling is established between a client web browser and a DNS server system web server. A user interface adapted to provide configuration access to a DNS server system is requested. The user interface is downloaded from the DNS server system over the computer network.

43 Claims, 8 Drawing Sheets

InfoBlox OODatabase Network Move Operation
Relink Hosts to the 192.168.20.0 Network

FIG. 8

DOMAIN NAME SERVICE SERVER

FIELD OF THE INVENTION

The present invention relates generally to server appliances, and more particularly to domain name service server appliances.

BACKGROUND OF THE INVENTION

A domain name service (DNS) is generally a directory service for translating user friendly alphanumeric names for specific computers or hosts within a computer network into computer recognizable numerical addresses. While DNS was originally developed to facilitate communications between computers via the Internet, the use of DNS is becoming increasingly common in intranet environments, especially those which employ Internet Protocol (IP) to send data from one computer to another within a network.

Intranet and Internet-connected computers utilize a numeric addressing system to locate and route communications to other computers within a network. The numeric addressing system requires that each computer connected to the Internet have its own unique numeric IP address. IP addresses are typically 32 bit addresses that are represented by a string of numbers separated by periods, such as for example, "192.168.10.100." Since numeric addresses are difficult to remember, DNS was created to enable the pairing of domain names to specific numeric IP addresses. For example, when an Internet user types in the domain name "www.support.infoblox.com," DNS is the intermediary system that translates the domain name to the corresponding numeric IP address, "192.168.10.100."

There are generally two different entities which interact with the DNS server: clients and administrators. Clients are generally other computers which request IP addresses associated with specific domain names from the DNS server. Administrators are the individuals responsible for managing the DNS data stored in the DNS server.

Many large organizations, such as for example corporate intranets, commercial Internet Service Providers (ISPs), Internet content providers and educational and government institutions maintain IP based computer networks. Such organizations typically develop and maintain their own DNS servers for Internet and intranet applications. For prior art systems, establishing a DNS server usually requires the expertise of an information technology (IT) specialist and involves the selection and integration of multiple hardware and software components.

The software components in a prior art system typically include an operating system and a DNS server software package. The DNS server hardware generally consists of typical computer hardware including a processor, a hard drive, and memory. The DNS server software typically includes a DNS server engine, a database for storing DNS data and a graphical user interface (GUI) which permits the administrator to access the database. The DNS server engine responds to client requests for DNS data by retrieving the requested data from the DNS database and forwarding the retrieved data to the client.

The DNS server software can be selected from a number of prior art DNS server software packages available for purchase or a DNS software package, Berkeley Internet Domain Name (BIND), can be downloaded free of charge from the Internet Software Consortium. Since the DNS server hardware and the operating system are acquired separately from the DNS server software, DNS server software developers may be unable to create software to optimize the performance of the DNS server for particular hardware and software systems. The specifications of the DNS server hardware, such as the specific hard drive model, the processor speed, the memory size and hardware component redundancies as well as operating system parameters, such as Transmission Control Protocol/Internet Protocol (TCP/IP) stack parameters and kernel memory allocation sizes are generally unknown to the DNS server software developers at the time they are developing such software.

Selecting appropriate hardware and an appropriate operating system for the DNS server requires research into the minimum operating system requirements and the minimum hardware requirements necessary to support the DNS server software. In addition, standard operating systems typically include a multitude of drivers that are unnecessary for the operation of a DNS server, such as for example drivers for sound cards, video cards and all available disk drives. The presence of extra drivers within the operating system creates a potential for conflicts with other DNS server software components thereby increasing the likelihood of error or malfunctions. The larger kernel size of an operating system with unnecessary drivers often results in decreased DNS server performance, such as reduced input/output throughput to the computer network and hard drive.

Following the selection of the appropriate DNS server hardware, the DNS server software requires tuning to the selected hardware to optimize the performance of the DNS server. For example, kernel buffer sizes have to be set to match the specific input/output hardware including a disk controller and network adapters.

Prior art DNS server software packages typically include a relational database for storing DNS data. DNS data generally consists of numerous data items with often complex interconnections between those items. Relational databases do not easily support complex mapping between data items and as a result multiple complex relational queries in a relational query language, such as Structured Query Language (SQL), may be required to perform simple modifications to data relationships within the database.

Prior art DNS server software packages also includes graphical user interfaces (GUIs) which permit the administrator to access the relational database. GUIs are typically installed on a single computer and accessible only on that computer by the administrator. Typically, DNS server software does not permit access to the GUIs from any networked computer within a computer network. The selection and integration of network software, such as PC Anywhere, with the DNS server system may be used to permit the administrator to access the GUI over a computer network. However, such software does not work with World Wide Web (WWW) protocols and requires special installation on every computer used to access the DNS server computer. Also, prior art DNS servers typically do not include a web based interface to access GUIs.

Prior art DNS servers may also have multiple unnecessary hardware and software access points. For example, the DNS server hardware can be accessed via a monitor, a keyboard, a mouse, a parallel port, serial ports, a network interface and a universal serial bus (USB) interface. The availability of multiple access points render the DNS server susceptible to access by unauthorized personnel. In addition, standard operating systems also include multiple access points, such as a console terminal and numerous network ports. The availability of such unnecessary access ports render the DNS server vulnerable to potential attacks from computer hackers and may also cause the DNS server to run inefficiently.

SUMMARY OF THE INVENTION

A method of providing configuration access to a DNS server system from a client in a computer network includes establishing communicative coupling between a client web browser and a DNS server system web server. A user interface adapted to provide configuration access to a DNS server system is requested. The user interface is downloaded from the DNS server system over the computer network.

The user interface may comprise a GUI.

The user interface may comprise a JGUI.

The user interface may be adapted to provide configuration access to a DNS database.

The user interface may be adapted to provide configuration access to a DNS object oriented database.

The user interface may be adapted to provide access to an object oriented database.

Communicative coupling may be established between the client web browser and a DNS configuration server.

The computer network may comprise the Internet.

The computer network may comprise an IP based computer network.

The computer network may comprise an intranet.

Communicative coupling may be established between the user interface and a configuration server.

The DNS server system may comprise a DNS server appliance.

In accordance with another aspect of the present invention, a method of providing an IP address for a host in a computer network includes receiving a request for an IP address associated with a domain name from a client in a computer network. The requested IP address is retrieved from an object oriented database. The retrieved address is transmitted to the client.

Communicative coupling may be established between a client web browser and a DNS server.

The computer network may comprise the Internet.

The computer network may comprise an IP based computer network.

The computer network may comprise an intranet.

The DNS server system may comprise a DNS server appliance.

DETAILED DESCRIPTION OF THE INVENTION

Figure 1:
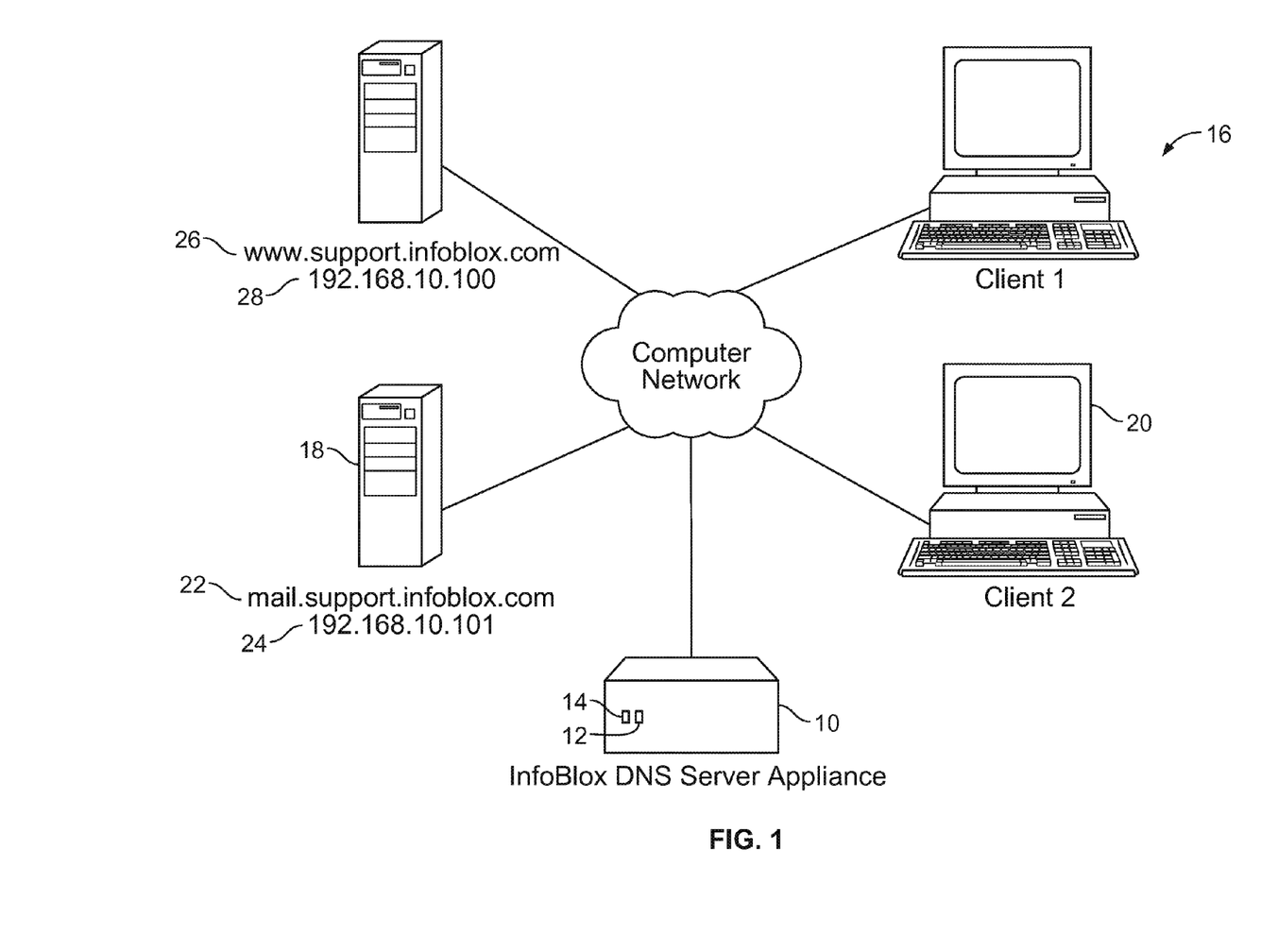
FIG. 1 is a block diagram representation of the DNS server appliance within a computer network in accordance with the principles of the present invention.

Referring to FIG. 1, a domain name service (DNS) server appliance 10 in accordance with a preferred embodiment of the present invention is shown in a computer network 16. Matched hardware and pre-installed software components are integrated into a fully functional package to facilitate the installation and operation of the DNS server appliance 10. The DNS server appliance 10 includes a power button 12 and a status light 14 which is turned on when power is supplied to the DNS server appliance 10.

The DNS server appliance 10 is adapted for use in Internet Protocol (IP) based computer networks, such as the Internet and intranet applications employing IP to convey data from one networked device to another networked device. The computer network 16 including a plurality of hosts 18, a plurality of clients 20 and the DNS server appliance 10 is shown. Each host 18 is identifiable by at least one domain name 22 and a unique IP address 24. For example, the host computer 18 may be identified by its domain name "www.support.infoblox.com" 26 or by its IP address as "192.168.10.100" 28.

The DNS server appliance 10 is limited to enable interaction with clients 20 and administrators. When a client 20 wishes to establish a network connection with the host computer 18 for "www.support.infoblox.com," 26, the client 20 contacts the DNS server appliance 10 and requests the IP address 24 associated with the domain name "www.support.infoblox.com" 26. The DNS server appliance 10 supplies the client 20 with the corresponding IP address "192.168.10.100" 28. The client 20 then uses the received IP address 24 to send data packets to the host 18. The DNS server appliance 10 is designed to enable the administrator to access the DNS server appliance 10 via the computer network 16 using any client 18. This permits an administrator to perform routine administrative functions, such as updating the IP address 24 for a domain name 22, via a remote networked computer.

Figure 2:
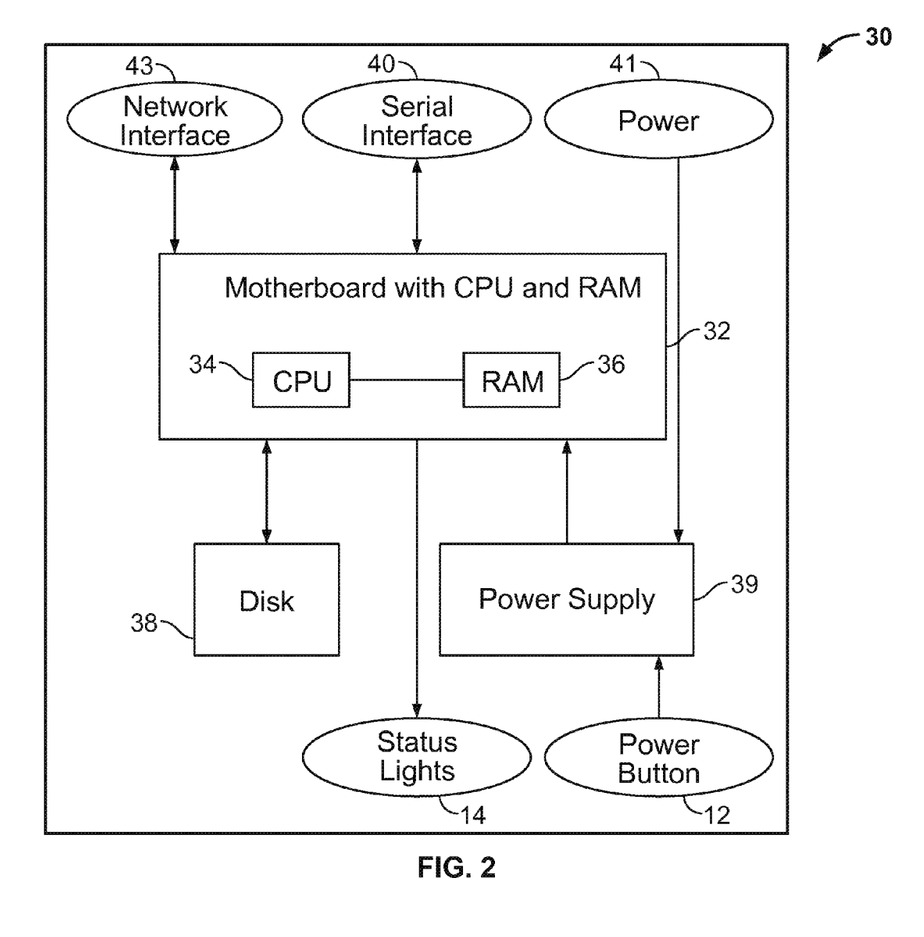
FIG. 2 is a block diagram representation of the hardware components of the DNS server appliance of FIG. 1.

Referring now to FIG. 2, the DNS server appliance hardware 30, the platform for running and storing DNS server appliance software, storing DNS data and providing an interface to the computer network 16, is shown. The DNS server appliance hardware 30 generally includes a computer motherboard 32 including a central processing unit (CPU) 34 coupled to a random access memory (RAM) 36. A disk 38, such as for example a multigigabyte hard drive, is used to store DNS server appliance software and DNS data and is coupled to the motherboard 32. A power supply 39 is adapted to be coupled to an alternating current (AC) power source (not shown), such as for example a 110 Volt AC power source, via a power input 41. The power supply 39 is also coupled to the motherboard 32 and converts the AC power supplied by the power source into a direct current (DC) voltage, such as for example ±5 DC volts, to power-the-motherboard 32. The power button 12 is coupled to the power supply 39 and controls the application of power to the motherboard 32. The status light 14, such as for example a light emitting diode (LED), is coupled to the motherboard 32 and provides an indication of when power is supplied to the motherboard 32 and the DNS server appliance 10 is powered on. A network interface 43 to the motherboard 32 is provided to permit a client 20 to access the DNS server appliance 10 to request an IP address 24 for a specific domain name 22. A serial interface 40 to the motherboard 32 provides the administrator with access to the motherboard 32 to assign an IP address 24 to the DNS server appliance 10. The DNS server appliance 10 hardware configuration limits the number of hardware access ports to minimize the risk of unauthorized access to the DNS server appliance software and DNS data. Limiting the number of hardware access ports also reduces the number of software drivers necessary to operate the DNS server appliance 10 thereby reducing inefficiencies in the system.

In an alternative embodiment, multiple disks may be used to provide redundancy and increase system reliability. In another embodiment, a wireless access port, such as an infrared port, may be added to the system or may be substituted for the serial interface 40. Such a port would enable an administrator to assign an IP address 24 to the DNS server with the use of a personal assistant device, such as a Palm Pilot. While the preferred embodiment of the DNS server appliance 10 includes the disclosed hardware configuration, alternative configurations of hardware adapted to optimize DNS server appliance performance and provide limited access to DNS server appliance software are considered to be within the scope of the invention.

Figure 3:
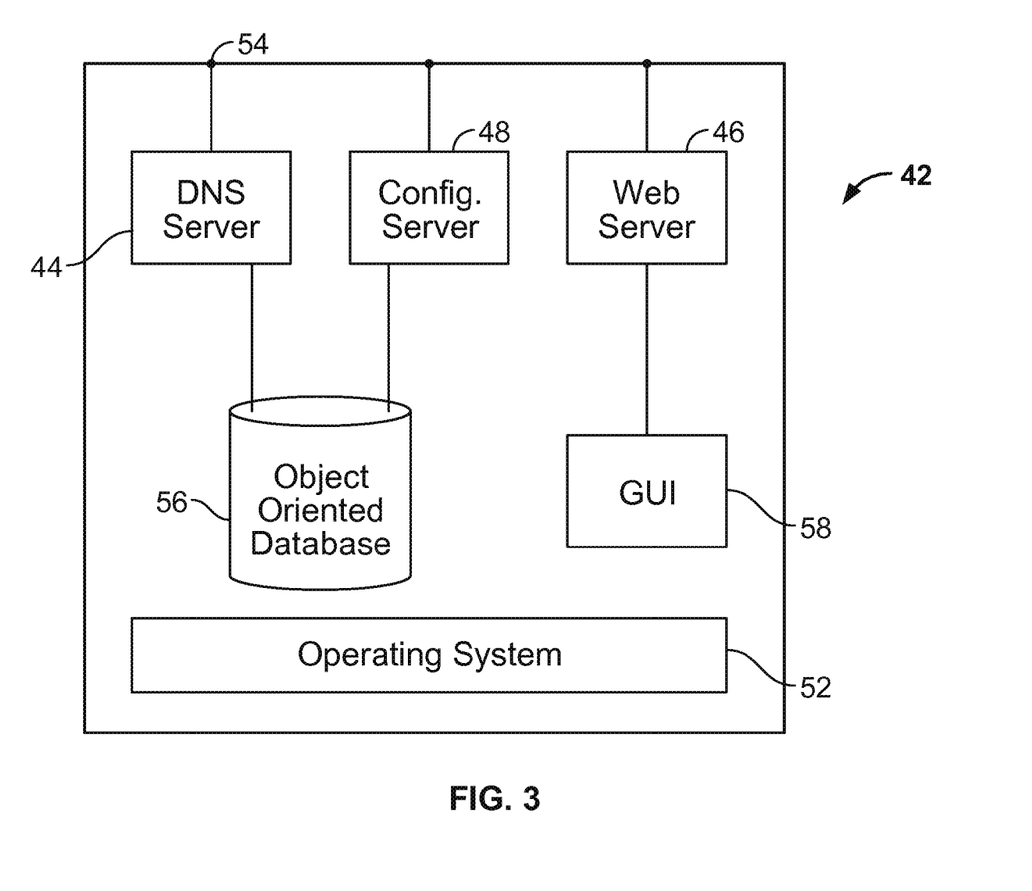
FIG. 3 is a block diagram representation of the software components of the DNS server appliance of FIG. 1.

Turning now to FIG. 3, the DNS server appliance software components 42 including DNS server 44, a web server 46 and a configuration server 48 all run on an operating system 52. Network ports 54 provide communication links between each server and the computer network 16. An object oriented database 56 is generally used to store domain name data and IP address data. A graphical user interface (GUI) 58 is provided to enable the administrator to access the object oriented database 56 to perform configuration changes, such as modifications and updates. In an alternative embodiment, a dynamic host configuration protocol (DHCP) server may also be included as a component of the DNS server appliance 10.

The DNS server 42 is coupled to the computer network 16 via a network port 54 and to the object oriented database 56. When a client 20 issues a request for an IP address 24 associated with a specific domain name 22, the DNS server responds to the request by accessing the object oriented database 56 to retrieve the requested IP address 24 and conveying the retrieved IF address 24 to the client 20 via the network port 54.

The web server 46 is adapted to perform the single function of responding to a request from the administrator to retrieve and deliver the GUI 58 to the administrator. The administrator uses a networked client 20, to convey a request to the web server 46 to download the GUI 58. The web server 46 responds to the request by retrieving the GUI 58 from the disk and conveying it via the computer network 16 to the administrator's networked client 20. The downloaded GUI 58 runs on a standard web browser, such as Netscape or Internet Explorer and establishes an interface between the client 20, being used by the administrator, and the configuration server 48. The configuration server 48 responds to commands issued by the administrator via the GUI 58 to perform configuration changes to the object oriented database 56.

The DNS server appliance software components 42 and the operating system 52 are specifically matched and tuned to accommodate the specifications of the DNS server appliance hardware components 30 to optimize the overall performance of the DNS server appliance 10.

In the preferred embodiment, the operating system 52 is derived from an operating system kernel, as is included in a standard Linux distribution. The necessary device drivers are added to the operating system kernel. The device drivers used are specifically matched to the DNS server appliance hardware 30 and updated with the most recent patches to achieve the higher levels of system stability and performance. For example, unnecessary drivers or other utilities are present in the kernel operating system are removed or disabled. The lack of extra drivers reduces the possibility of conflicts occurring between the operating system software and other DNS server appliance software components. The reduced kernel size of the operating system 52 increases DNS server appliance performance. For example, input/output throughput to the computer network 16 and hard drive is increased. The operating system 52 is also streamlined to eliminate unnecessary software access points, such as unnecessary network ports 54. This reduces the vulnerability of the DNS server appliance 10 to potential attacks by hackers. In addition, the DNS server software components 42 are pre-installed and pre-configured for operation so as to reduce the time and expertise necessary to install and operate the DNS server appliance 10.

An alternative embodiment of the DNS server appliance includes a microkernal operating system which may be embedded in a read only memory (ROM) boot image. In another embodiment, a solid state storage device is used to store the object oriented database. The use of a microkernal operating system, ROM boot image, and solid state storage eliminates the need for a mechanical storage disk in the DNS server appliance thereby reducing the amount of DNS server appliance hardware which in turn reduces the possibility of potential hardware malfunctions.

Figure 4:
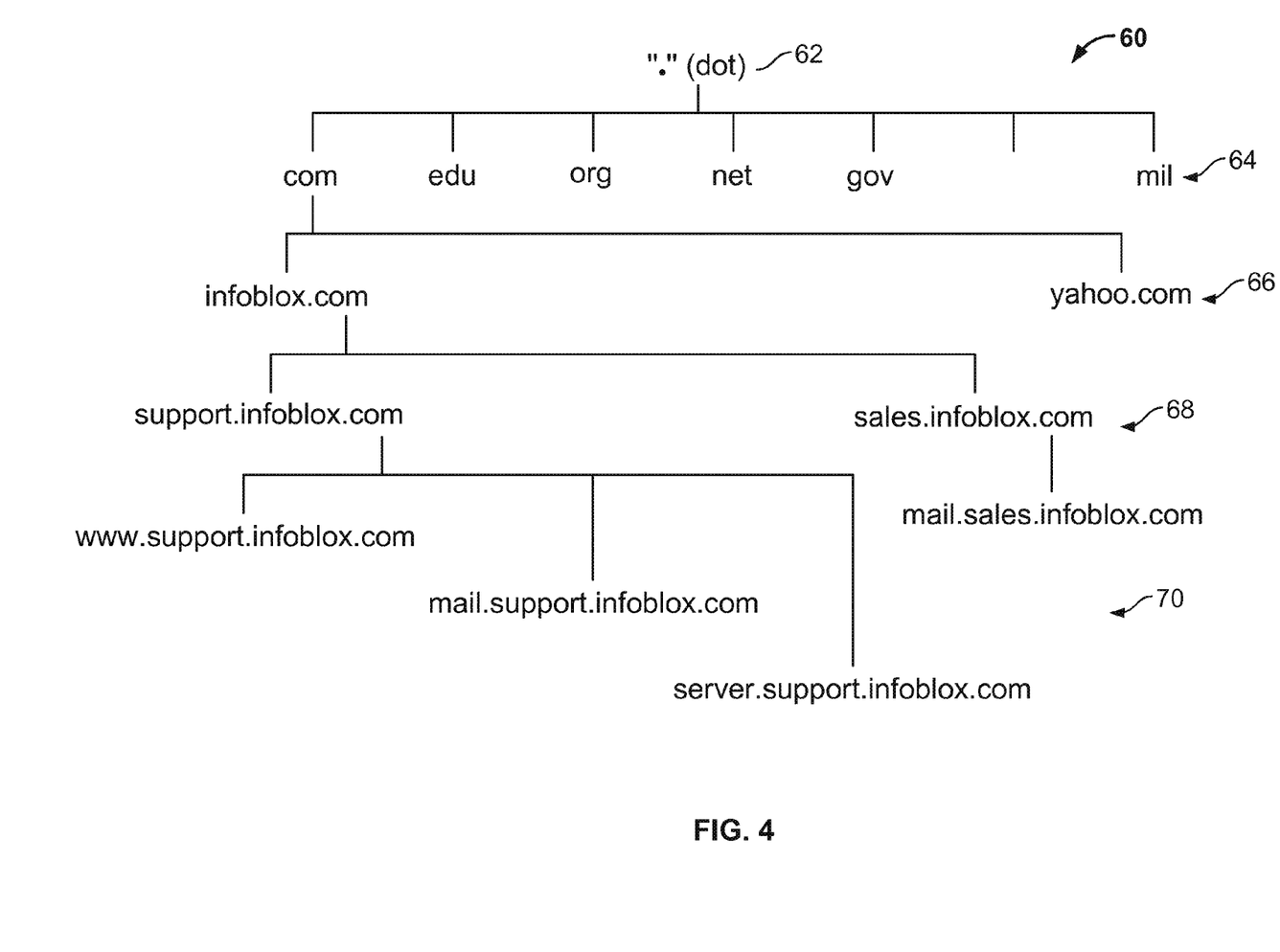
FIG. 4 is a representation of a hierarchical structure of zones and sub-zones in the DNS system.

Referring now to FIG. 4, DNS uses a logical hierarchical structure 60 consisting of zones and sub-zones to facilitate the organization of domain names within the DNS system. Such a structure is comparable to an inverted tree with the root "dot" 62 at top of the hierarchy. The root "dot" 62 branches down to the top level of zones 64. Examples of top level zones 64 include "com," "edu," "org," "net," "gov," and "mil," as well as abbreviations for numerous countries. Each top level zone 64 may branch further into a number of sub-zones or second level zones 66. For example the top level zone "com" may include a number of second level sub-zones such as "infoblox.com" and "yahoo.com." The second level sub-zones 66 may branch into further third level sub-zones 68. For example, the second level sub-zone "infoblox.com" includes further third level sub-zones "support.infoblox.com" and "sales.infoblox.com." The lowest level sub-zone 70 includes one or more hosts 18. For example, the sub-zone "support.infoblox.com" includes three hosts: "www. support.infoblox.com," "mail. support.infoblox.com" and "server. support.infoblox.com." The sub-zone "sales.infoblox.com" includes a single host, "mail.sales.infoblox.com." FIG. 4 is merely illustrative of a example of an hierarchy within the DNS system. Different DNS hierarchies may include a greater or fewer number of sub-zones. In addition, it is possible for a member of a sub-zone to be linked to more than one upper level zones.

Figure 5:
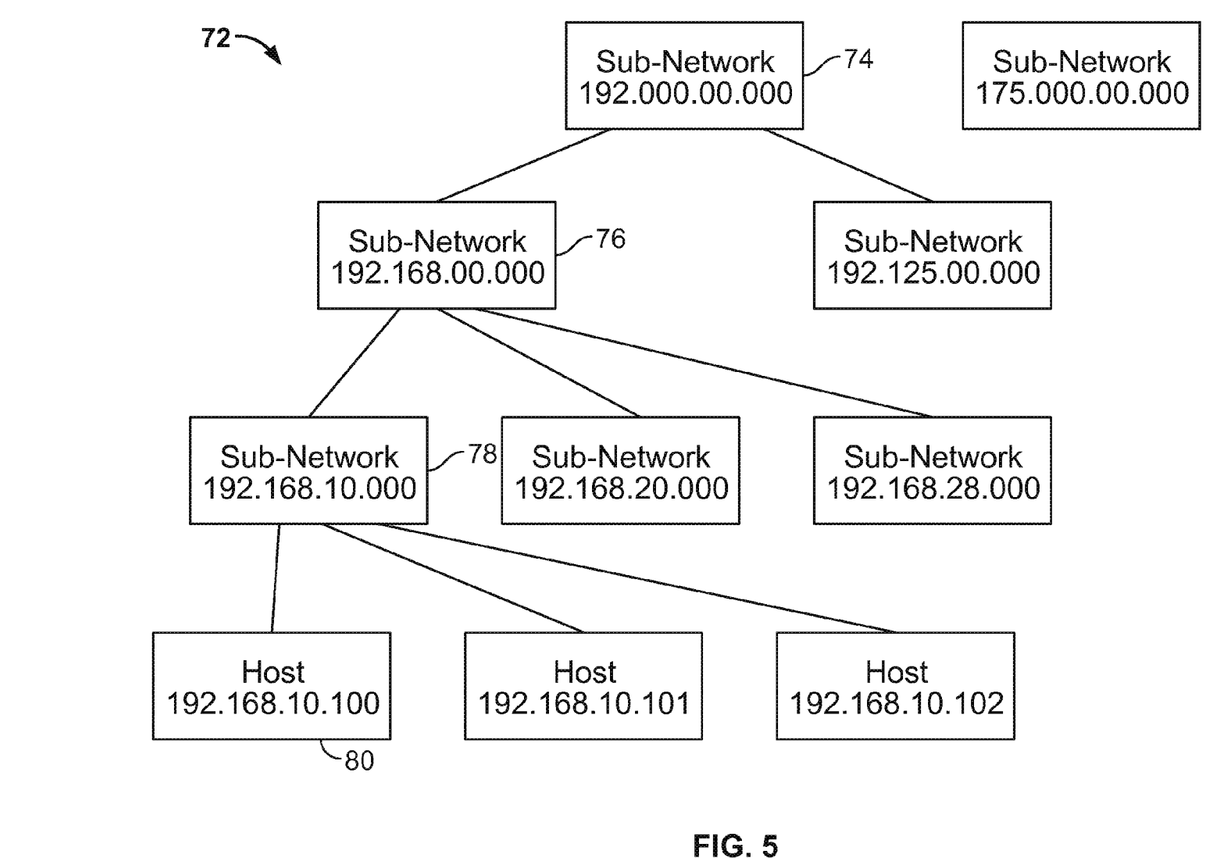
FIG. 5 is a block diagram representation of data routes from a client to a host via sub-networks.

Referring now to FIG. 5, a block diagram representation of an example of a network configuration 72 is shown, where a client 20 sends a data packet to a host 18 having an IP address "192.168.10.100". IP addresses 24 for hosts 18 generally consist of four numbers separated by periods, such as for example 192.168.10.100. When a client 20 sends data packets to a given host 18, the IP address designates the route that the data packets must take to reach the host associated with the IP address 24. The route consists of a number of sub-networks within the computer network 16. Each sub-network is associated with a router. Routers are responsible for interpreting IP addresses 24 and channeling appropriate packets into appropriate sub-networks. The client 20 routes the data packet with the IP address 24 to the routers. The router recognizing "192.000.00.000" as the designation 74 for its associated sub-network accepts and routes the data packet to additional routers associated with further sub-networks. The router recognizing "192.168.00.000" as the designation 76 for its associated sub network accepts and further routes the data packet to routers associated with further sub networks. The router recognizing "192.168.10.000" 78 as the designation for its associated sub network accepts the data packet and routes the data packet to the hosts 18 within the sub network. The host 80 having the IP address of "192.168.10.100" accepts the data packet.

Figure 6:
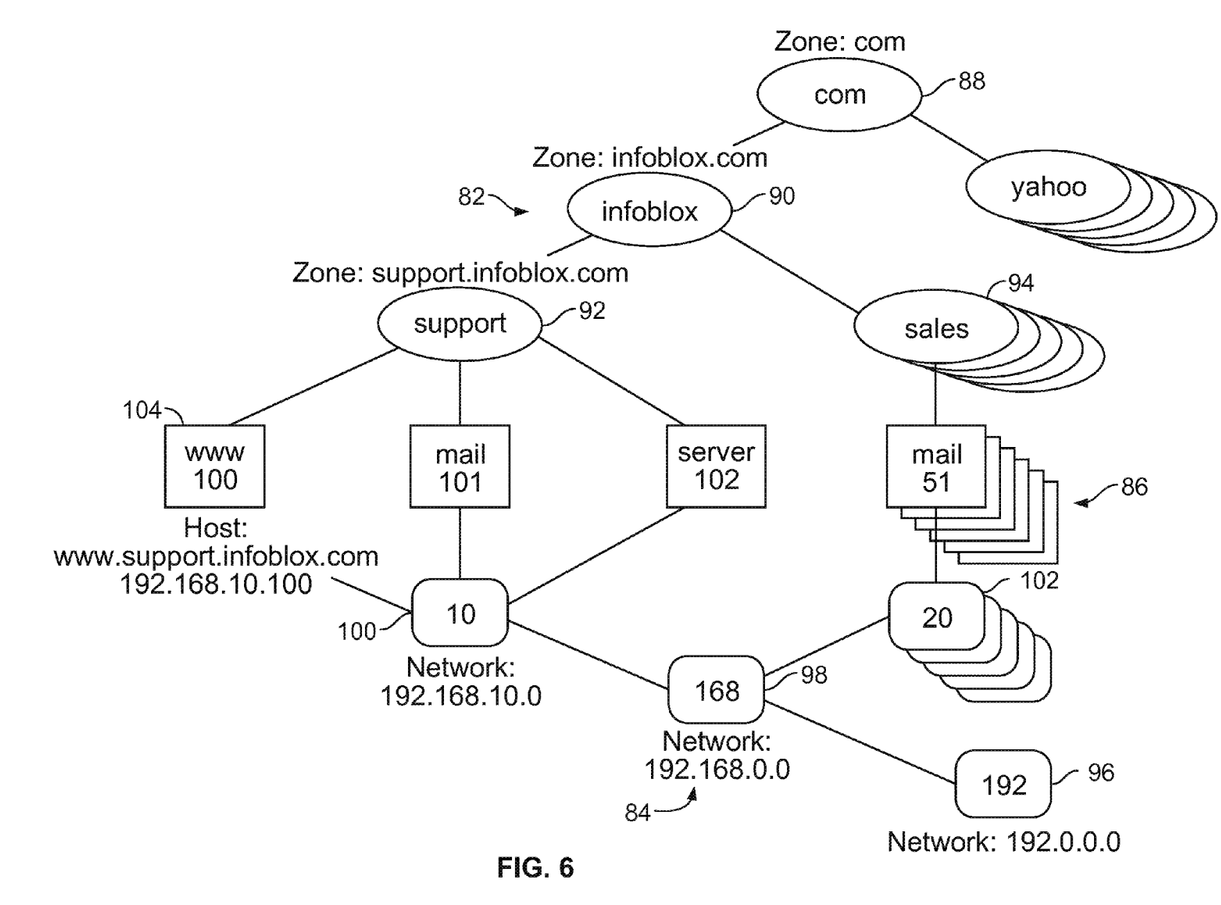
FIG. 6 is a block diagram representation of objects typically stored in a DNS object oriented database.

As shown in FIG. 6, the hierarchical zone information associated with domain names 22 and the sub-network designations are used by the DNS server appliance 10 to store domain name data and IP address data in the object oriented database 56. The DNS server appliance 10 stores the hierarchical zone information as zone objects 82, network designations as network objects 84 and the host data as host objects 86. For example, the zone "com" is represented in the objected oriented database as a zone object 88 having an attribute "com". Similarly, the zone "infoblox.com" is represented as a zone object 90 having an attribute "infoblox" and an association to the zone object 88 having the attribute "com". The zone "support.infoblox.com" is represented as zone object 92 having the attribute "support" and the zone "sales.infoblox.com" is represented as zone object 94 respectively, with each zone object having an association to the zone object 90 having the attribute "infoblox".

The network designations are stored in a similar manner. For example, the network designation "192.000.00.000" is stored as a network object 96 having an attribute "192". The network designation "192.168.00.000" is stored as a network object 98 having an attribute "168" and an association to the network object 96 having the attribute "192". Network designation "192.168.10.000" is stored as network object 100 having the attribute of "10" and network designation "192.168.20.000" is stored as network object 102 having the attribute of "20" respectively, with each network object having an association to the network object 98 having the attribute "168".

The hosts 18 are also stored as host objects 86 where each host object 86 has two attributes. For example, the host "www.support.infoblox.com" is stored as a host object 104 having attributes "www" and "100" and associations to the zone object 92 having the attribute "support" and the network object 100 having the attribute "10". The other hosts 18 are stored in a similar manner as host objects 86 with two attributes and an association to a zone object 82 and a network object 84. While the preferred embodiment discloses the use of the described object oriented database model, alternative object models are also within the scope of the invention.

The process of requesting and retrieving an IP address 24 associated with a specific domain name 22 from the DNS server appliance 10 begins with the client 20 providing a domain name, such as "www.support.infoblox.com," to the web browser. The web browser establishes a connection with the DNS server 44 and issues a request for the IP address 24 associated with the provided domain name, "www.support.infoblox.com."

The DNS server 44 first identifies the top level zone 64 in the domain name "www.support.infoblox.com " as "com". The DNS server 44 uses this information to access the object oriented database 56 and retrieve the zone object 88 having the attribute "com". The DNS server 44 then identifies the next sub-zone 66 in the hierarchy as "infoblox.com." The DNS server 44 then accesses the object oriented database 56 and retrieves the zone object 90 having the attribute "infoblox" and an association to the zone object 88 having the attribute "com". The DNS server 44 then identifies the next sub-zone 68 in the hierarchy as "support.infoblox.com." The DNS server 44 uses this information to access the object oriented database 56 and retrieves the zone object 92 having the attribute "support" and an association to the zone object 90 having the attribute "infoblox".

The DNS server 44 realizes that it has reached the last term in the domain name 22 and that "www.support.infoblox.com" identifies the host 18. The DNS server 44 returns to the object oriented-database 56 and identifies the host object 104 having the attribute "www" and an association with the zone object 92 having the attribute "support." The identified host object 104 also has a second attribute "100." The DNS server 44 recognizes that the host object 104 has an association to the network object 100 having the attribute "10" which in turn has an association to the network object 98 having the attribute "168" which in turn has an association to the network object 96 having the attribute "192". As a result, the DNS server 44 is able to retrieve the entire IP address of "192.168.10.100" in a single access. The DNS server 44 forwards the requested IP address 24 to the client 20. The client 20 then uses the supplied IP address 24 to establish a connection with the host 20.

In the previous example, the DNS server 44 accessed the object oriented database 56 a total of four times to perform the IP address retrieve operation, as opposed to a relational database which would have required the DNS server to access the relational database seven times. Storing the zones, network designations and hosts 18 as objects in an object oriented database 56 permits the mapping of complex interrelationships between data items in such a manner as to enable the DNS server 44 to retrieve IP addresses 24 using a fewer number of database accesses. Given the large number of IP addresses 24 retrieved by the DNS server appliance 10 on a routine basis, the use of an object oriented database 56 increases the efficiency of the operation of the DNS server appliance 10 by reducing the number of database accesses required per IP address 24 retrieval.

Figure 7:
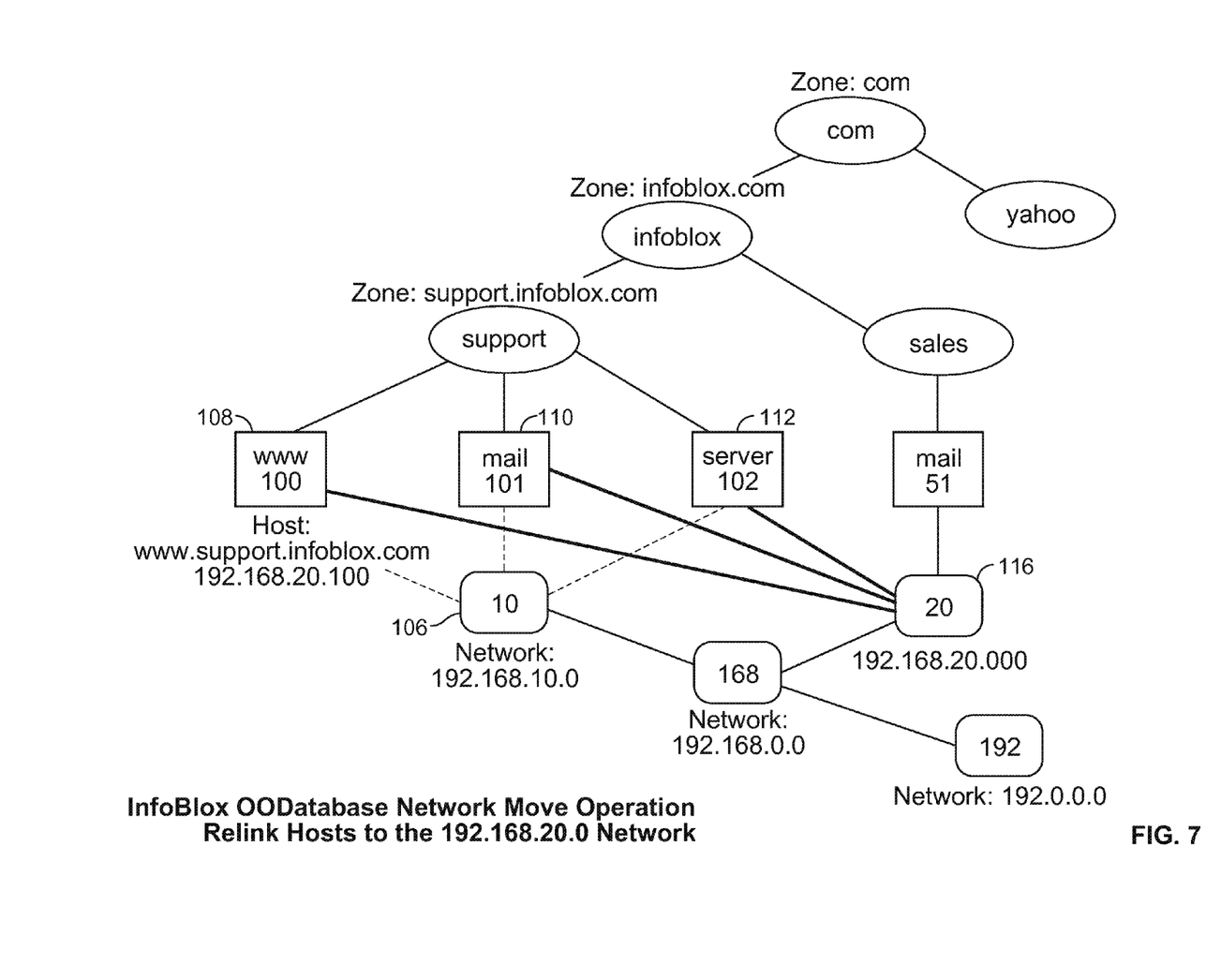
FIG. 7 is a block diagram representation illustrating the rerouting of host objects within the DNS object oriented database.

Referring now to FIG. 7, networks are often reconfigured resulting in changes to the IP address 24 associated with a host 18. This requires that the DNS server appliance 10 be updated to reflect the new IP address 24 so that data packets addressed to affected hosts 18 are rerouted appropriately through other available sub-networks. Suppose for example, that the sub-network 106 designated as "192.168.10.000" was removed from the computer network 16. The DNS server appliance 10 would have to be updated with a new IP addresses 24 for the host 108 "www.support.infoblox.com," the host 110 "mail.support.infoblox.com" and the host 112 "server.support.infoblox.com." To update the DNS server appliance 10, the affected hosts 108, 110, 112 are first unlinked from the unavailable sub-network 106. This is achieved by first removing the network object 106 having the attribute "10" from the object oriented database 56. The deletion of the network object 106 automatically removes the associations between the affected host objects 108, 110, 112 and the network object 106. Next the affected hosts 108, 110, 112 must be relinked to the available sub-network "192.168.10.000." Associations between the network object 116 having the attribute "20" and the affected host objects 108, 110, 112 are created. The DNS server appliance 10 automatically updates the IP addresses 24 for the hosts "www.support.infoblox.com," "mail.support.infoblox.com" and "server.support.infoblox.com" to "192.168.20.100," "192.168.20.101" and "192.168.20.102," respectively. Storing the sub-network designations as objects facilitates the reassignment of hosts to different sub networks by minimizing the number of modifications an administrator is required to make to implement a successful reassignment.

Figure 8:
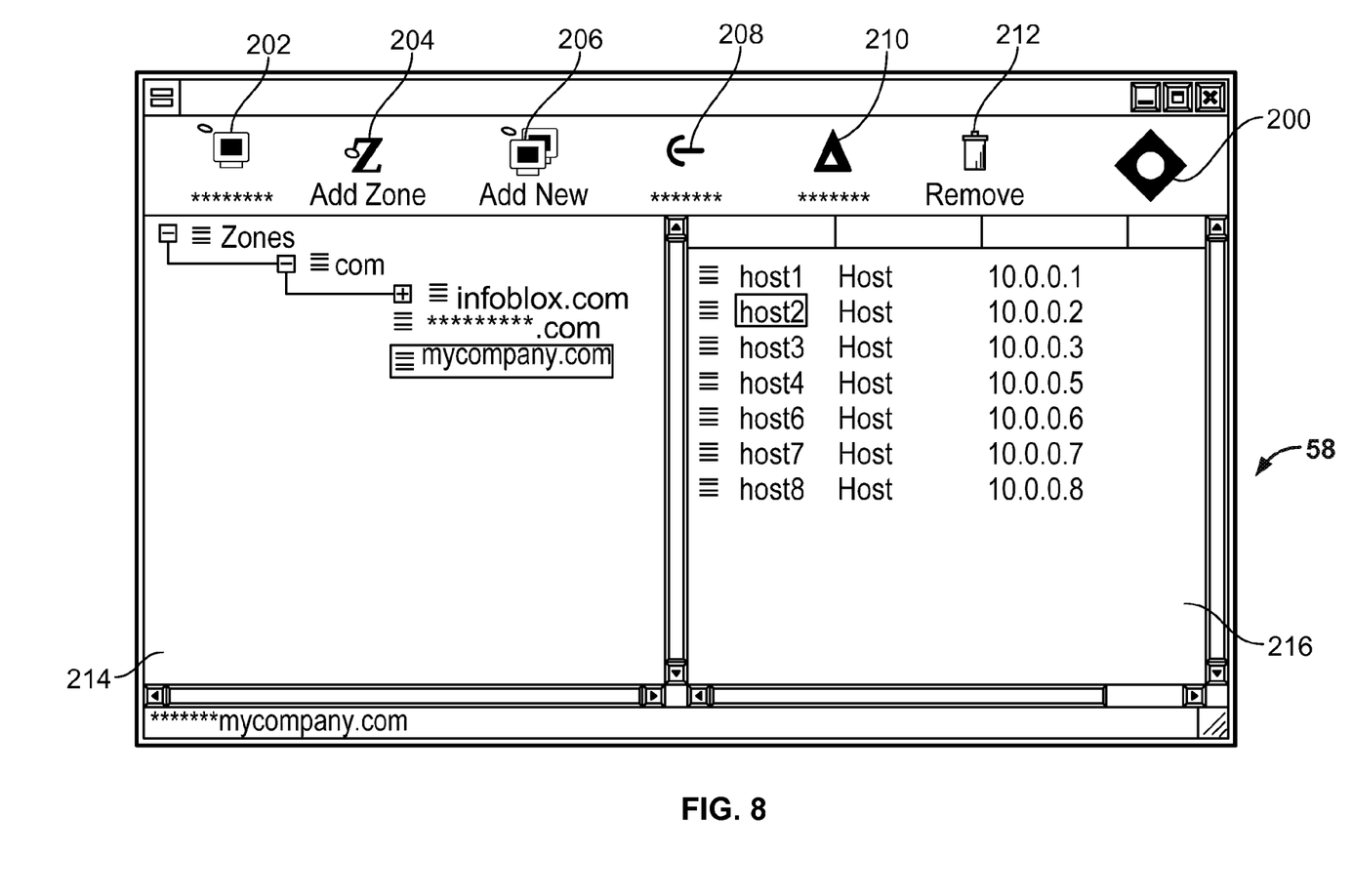
FIG. 8 is an example of a GUI for accessing the DNS server appliance.

Referring now to FIG. 8, the administrator makes configuration changes to the object oriented database 56 via the GUI 58, an example of which is shown. The GUI 58 includes an upper header section 200 including a plurality of icons with a text label below each icon. Upon clicking on an icon, a dialogue box is provided requesting the data necessary to implement the configuration operation associated with that icon. Selecting the first icon 202 enables the administrator to add network objects to the object oriented database 56. The second icon 204 provides a mechanism for adding zone object. Similarly, clicking on the third icon 206 provides for the addition of a network object. Clicking on the fourth icon 208 permits the user to add additional domain names associated for IP addresses already present in the database. Clicking on the fifth 210 and sixth 212 icons permits the administrator to modify an existing object and remove objects, respectively, from the object oriented database. The remainder of the GUI is divided into a first section 214 and a second section 216. The first section 214 displays network and zone information in a tree format. The second section 216 displays a listing of hosts associated with user selected zones or networks.

In the preferred embodiment, a Java applet is used as the GUI 58. An applet is a type of Java application that is adapted to be downloaded from a web server by a web browser via the computer network 16 and executed as a web browser application. Such web browser applications include Netscape and Internet Explorer. In the preferred embodiment the GUI 58 is developed using a customized GUI library, such as Java Graphical User Interface (JGUI). A GUI library is a collection of GUI widgets, such as buttons, scroll bars and windows. A JGUI based interface provides the same GUI screenshot regardless of the underlying operating system. For example, a client would have a GUI screenshot with the same look and feel whether the GUI was downloaded to a Windows system, Xwindows, Macintosh windowing system. The JGUI based interface reduces the GUI 58 response time, for example bringing up a dialogue box following the selection of an associated button typically takes less time than on other types of GUIs.

While in the preferred embodiment, the use of JGUI is disclosed, other types of GUIs such as those based on Java Abstract Windows Toolkit (AWT), Hypertext Markup Language (HTML), JavaScript, Visual Basic Script (VBScript) and web browser plugins, such as Macromedia's Flash, are also considered to be within the scope of the invention. In addition, the preferred embodiment discloses the use of a web browser in conjunction with a web server 46 to deliver the GUI 58 to the administrator, other comparable methods of retrieving the GUI 58 from the DNS server appliance 10 over the computer network 16 are also considered to be within the spirit of the invention.

In the preferred embodiment, the DNS server appliance 10 is adapted to enable a one click auto software upgrade of all of the DNS server appliance software, including the operating system 52, simultaneously. This minimizes the risk of software incompatibilities which can often lead to system failures. The administrator initiates the auto software upgrade by clicking on a single button provided on the GUI 58.

In an alternative embodiment, the DNS server appliance 10 is provided with a server to server auto failover feature. This enables an administrator to run a set of redundant DNS server appliances 10, a primary and a secondary DNS server. Both DNS server appliances 10 receive simultaneous updates to their object oriented databases 56, so that they both contain identical DNS data. In the event the DNS server appliance 10 fails, a scheme is automatically implemented to hand over control to the secondary DNS server appliance 10 without any action required on the part of the administrator. In an alternative embodiment, the DNS server appliance includes a self-upgrade feature where the DNS server can automatically update its software without any action from an administrator.

In another embodiment, the DNS server appliance 10 maintains a journaled file system to increase the reliability of the system.

In an alternative embodiment, specialized hardware, such as EZ chip, may be used to resolve domain name to IP address maps or IP address to domain name maps as wire speed.

While the invention has been described with specific embodiments, other alternatives, modifications and variations will be apparent to those skilled in the art. Accordingly, it is intended to include all such alternatives, modifications and variations set forth with the spirit and scope of the appended claims.

The invention claimed is:

1. A method for a Domain Name Service (DNS), comprising:
receiving, from a device in an IP based network, a request to provide an IP address associated with a domain name, wherein the domain name is associated with a zone;
retrieving the IP address from a data store; and
transmitting the retrieved IP address to the device;
wherein:
the data store stores a set of zone objects including a first zone object associated with the zone, wherein the first zone object is linked to a second zone object associated with a sub-zone of the zone; and
the set of zone objects are associated with a set of network objects, and a host object is associated with the domain name and the IP address, wherein the host object is stored with a first attribute corresponding to a first sub-zone of the domain name and a second attribute corresponding to a first numerical sub-network designation of the IP address.

2. The method of claim 1, wherein the data store further stores the set of network objects including a logically hierarchical subset of network objects each associated with a numerical sub-network designation, wherein the logically hierarchical subset of network objects corresponds to the IP address associated with the host object.

3. The method of claim 1, wherein the IP based network comprises the Internet or an intranet.

4. The method of claim 1, wherein the data store includes an object oriented database, and wherein the set of zone objects are associated with the set of network objects through the host object.

5. The method of claim 1, wherein retrieving the IP address from the data store is performed by a computer server.

6. The method of claim 1, wherein retrieving the IP address from the data store is performed by an appliance that is in communication with a Domain Name Service (DNS) configuration server, wherein the DNS configuration server stores the data store, and wherein the data store includes an object based database.

7. The method of claim 1, wherein retrieving the IP address from the data store is performed by an appliance or a computer server implementing the Domain Name Service (DNS), and wherein the IP address comprises a requested IP address associated with a host identified in a DNS request.

8. The method of claim 1, further comprising:
unlinking an old network object from the host object;
deleting the old network object; and
linking the host object to a new network object.

9. The method of claim 1, further comprising:
providing a configuration interface.

10. The method of claim 1, further comprising:
providing a configuration interface, wherein the configuration interface includes a graphical user interface.

11. The method of claim 1, further comprising:
providing a configuration interface, wherein the configuration interface includes a web based interface accessible via a web browser.

12. The method of claim 1, wherein retrieving includes identifying a top level zone in the domain name and accessing a zone object associated with the top level zone.

13. The method of claim 1, wherein retrieving includes identifying a top level zone in the domain name and accessing a zone object associated with the top level zone, and wherein retrieving further includes identifying a sub-zone in the domain name and accessing a zone object associated with the sub-zone.

14. The method of claim 1, wherein retrieving includes identifying a top level zone in the domain name and accessing a zone object associated with the top level zone, wherein retrieving further includes identifying a sub-zone in the domain name and accessing a zone object associated with the sub-zone, and wherein retrieving further includes determining that a last term in the domain name has been reached and accessing a host object associated with the domain name.

15. A computer program product for a Domain Name Service (DNS) embodied in a non-transitory computer readable medium and comprising computer instructions for:
receiving, from a client in an IP based network, a request to provide an IP address associated with a domain name, wherein the domain name is associated with a zone;
retrieving the IP address from a data store; and
transmitting the retrieved IP address to the client;
wherein:
the data store stores a set of zone objects including a first zone object associated with the zone, wherein the first zone object is linked to a second zone object associated with a sub-zone of the zone; and
the set of zone objects are associated with a set of network objects, and a host object is associated with the domain name and the IP address, wherein the host object is stored with a first attribute corresponding to a first sub-zone of the domain name and a second attribute corresponding to a first numerical sub-network designation of the IP address.

16. The computer program product as recited in claim 15, wherein the data store further stores the set of network objects including a logically hierarchical subset of network objects each associated with a numerical sub-network designation, wherein the logically hierarchical subset of network objects corresponds to the IP address associated with the host object.

17. The computer program product as recited in claim 15, wherein the IP based network comprises the Internet or an intranet.

18. The computer program product as recited in claim 15, wherein the data store includes an object oriented database, and wherein the set of zone objects are associated with the set of network objects through the host object.

19. The computer program product as recited in claim 15, wherein retrieving the IP address from the data store is performed by a computer server.

20. The computer program product as recited in claim 15, wherein retrieving the IP address from the data store is performed by an appliance that is in communication with a Domain Name Service (DNS) configuration server, wherein the DNS configuration server stores the data store, and wherein the data store includes an object based database.

21. The computer program product as recited in claim 15, wherein retrieving the IP address from the data store is performed by an appliance or a computer server implementing the Domain Name Service (DNS), and wherein the IP address comprises a requested IP address associated with a host identified in a DNS request.

22. The computer program product as recited in claim 15, further comprising:
unlinking an old network object from the host object;
deleting the old network object; and
linking the host object to a new network object.

23. The computer program product as recited in claim 15, further comprising:
providing a configuration interface.

24. The computer program product as recited in claim 15, further comprising:
providing a configuration interface, wherein the configuration interface includes a graphical user interface.

25. The computer program product as recited in claim 15, further comprising:
providing a configuration interface, wherein the configuration interface includes a web based interface accessible via a web browser.

26. The computer program product as recited in claim 15, wherein retrieving includes identifying a top level zone in the domain name and accessing a zone object associated with the top level zone.

27. The computer program product as recited in claim 15, wherein retrieving includes identifying a top level zone in the domain name and accessing a zone object associated with the top level zone, and wherein retrieving further includes identifying a sub-zone in the domain name and accessing a zone object associated with the sub-zone.

28. The computer program product as recited in claim 15, wherein retrieving includes identifying a top level zone in the domain name and accessing a zone object associated with the top level zone, wherein retrieving further includes identifying a sub-zone in the domain name and accessing a zone object associated with the sub-zone, and wherein retrieving further includes determining that a last term in the domain name has been reached and accessing a host object associated with the domain name.

29. A system for a Domain Name Service (DNS), comprising:
a processor configured to:
receive, from a client in an IP based network, a request to provide an IP address associated with a domain name, wherein the domain name is associated with a zone;
retrieve the IP address from a data store; and
transmit the retrieved IP address to the client;
wherein:
the data store stores a set of zone objects including a first zone object associated with the zone, wherein the first zone object is linked to a second zone object associated with a sub-zone of the zone; and
the set of zone objects are associated with a set of network objects, and a host object is associated with the domain name and the IP address, wherein the host object is stored with a first attribute corresponding to a first sub-zone of the domain name and a second attribute corresponding to a first numerical sub-network designation of the IP address; and
a memory coupled with the processor, wherein the memory provides the processor with instructions.

30. The system of claim 29, wherein the data store further stores the set of network objects including a logically hierarchical subset of network objects each associated with a numerical sub-network designation, wherein the logically hierarchical subset of network objects corresponds to the IP address associated with the host object.

31. The system of claim 29, wherein the IP based network comprises the Internet or an intranet.

32. The system of claim 29, wherein the data store includes an object oriented database, and wherein the set of zone objects are associated with the set of network objects through the host object.

33. The system of claim 29, wherein retrieve the IP address from the data store is performed by a computer server.

34. The system of claim 29, wherein retrieve the IP address from the data store is performed by an appliance that is in communication with a Domain Name Service (DNS) configuration server, wherein the DNS configuration server stores the data store, and wherein the data store includes an object based database.

35. The system of claim 29, wherein retrieve the IP address from the data store is performed by an appliance or a computer server implementing the Domain Name Service (DNS), and wherein the IP address comprises a requested IP address associated with a host identified in a DNS request.

36. The system of claim 29, wherein the processor is further configured to:
unlink an old network object from the host object;
delete the old network object; and
link the host object to a new network object.

37. The system of claim 29, wherein the processor is further configured to:
provide a configuration interface.

38. The system of claim 29, wherein the processor is further configured to:
provide a configuration interface, wherein the configuration interface includes a graphical user interface.

39. The system of claim 29, wherein the processor is further configured to:
provide a configuration interface, wherein the configuration interface includes a web based interface accessible via a web browser.

40. The system of claim 29, wherein retrieve the IP address from the data store includes identify a top level zone in the domain name and accessing a zone object associated with the top level zone.

41. The system of claim 29, wherein retrieve the IP address from the data store includes identify a top level zone in the domain name and accessing a zone object associated with the top level zone, and wherein retrieve the IP address from the data store further includes identify a sub-zone in the domain name and accessing a zone object associated with the sub-zone.

42. The system of claim 29, wherein retrieve the IP address from the data store includes identify a top level zone in the domain name and accessing a zone object associated with the top level zone, wherein retrieve the IP address from the data store further includes identify a sub-zone in the domain name and accessing a zone object associated with the sub-zone, and wherein retrieve the IP address from the data store further includes determine that a last term in the domain name has been reached and accessing a host object associated with the domain name.

43. The system of claim 29, wherein the system for a Domain Name Service (DNS) comprises a DNS server appliance.

* * * * *